(12) United States Patent
Maier et al.

(10) Patent No.: US 11,235,632 B2
(45) Date of Patent: Feb. 1, 2022

(54) AXLE ASSEMBLY FOR A HEAVY GOODS VEHICLE, HEAVY GOODS VEHICLE COMPRISING AT LEAST ONE AXLE ASSEMBLY OF THIS KIND, AND HYDRAULIC ARRANGEMENT, IN PARTICULAR FOR ADJUSTING AN ADJUSTABLE UNIT THAT IS FORMED AS A CYLINDER-PISTON ARRANGEMENT

(71) Applicant: GOLDHOFER AG, Memmingen (DE)

(72) Inventors: Georg Maier, Illertissen (DE); Martin Völk, Ehingen (DE); Simon Steinmayer, Kronburg (DE); Horst Häfele, Babenhausen (DE)

(73) Assignee: GOLDHOFER AG, Memmingen (DE)

( * ) Notice: Subject to any disclaimer, the term of this patent is extended or adjusted under 35 U.S.C. 154(b) by 0 days.

(21) Appl. No.: 16/630,956

(22) PCT Filed: Jul. 12, 2018

(86) PCT No.: PCT/EP2018/068949
§ 371 (c)(1),
(2) Date: Jan. 14, 2020

(87) PCT Pub. No.: WO2019/012045
PCT Pub. Date: Jan. 17, 2019

(65) Prior Publication Data
US 2020/0384819 A1 Dec. 10, 2020

(30) Foreign Application Priority Data

Jul. 14, 2017 (DE) .................... 10 2017 212 127.0

(51) Int. Cl.
*B60G 3/14* (2006.01)
*B62D 13/04* (2006.01)
*B62D 13/06* (2006.01)

(52) U.S. Cl.
CPC ............. *B60G 3/145* (2013.01); *B62D 13/04* (2013.01); *B60G 2200/132* (2013.01); (Continued)

(58) Field of Classification Search
CPC .... B60G 3/14; B60G 3/145; B60G 2200/132; B60G 2300/04; B60G 2300/36; B62D 13/04; B62D 13/06
See application file for complete search history.

(56) References Cited

U.S. PATENT DOCUMENTS

| 4,768,802 A * | 9/1988 | Winkler | ................. | B62D 13/04 |
| | | | | 280/408 |
| 7,562,887 B1 * | 7/2009 | Sutton | ..................... | B60G 9/02 |
| | | | | 280/124.111 |

(Continued)

FOREIGN PATENT DOCUMENTS

| CA | 2673840 A1 * | 2/2010 | ............. B62D 13/04 |
| DE | 19636803 C1 | 11/1997 | |

(Continued)

OTHER PUBLICATIONS

German Application No. 10 2017 212 127.0, German Search Report dated Feb. 1, 2019, 6 pages.

(Continued)

*Primary Examiner* — Paul N Dickson
*Assistant Examiner* — Scott F. Underwood
(74) *Attorney, Agent, or Firm* — Kilpatrick Townsend & Stockton LLP

(57) ABSTRACT

The invention relates to an axle assembly of a heavy goods vehicle, comprising a pivot bearing steering rotational axis (X), a wheel support comprising at least one wheel that is mounted thereon so as to be rotatable about a wheel rotational axis (Z), the wheel rotational axis (Z) being arranged behind the steering rotational axis (X), in the travel direction (Continued)

(V), in every deflection state of the axle assembly, during straight travel, and a unit that is adjustable about the steering rotational axis (X) when the wheel support is rotated, the adjustable unit being adjustable between two operating states, specifically a forwards travel operating state in which it damps the rotational movement of the wheel support about the steering rotational axis (X), and a reverse travel operating state in which it introduces a steering force, which steers the axle assembly, into the axle assembly.

12 Claims, 10 Drawing Sheets

(52) U.S. Cl.
CPC ...... *B60G 2300/04* (2013.01); *B60G 2300/36* (2013.01); *B62D 13/06* (2013.01)

(56) References Cited

U.S. PATENT DOCUMENTS

| | | | | |
|---|---|---|---|---|
| 2005/0205329 | A1* | 9/2005 | Fanger-Vexler | B60K 6/52 |
| | | | | 180/234 |
| 2007/0262552 | A1* | 11/2007 | Sutton | B60G 11/265 |
| | | | | 280/124.157 |
| 2009/0273159 | A1 | 11/2009 | Sutton | |
| 2015/0076783 | A1 | 3/2015 | Swoboda et al. | |
| 2015/0266505 | A1 | 9/2015 | Merkel et al. | |
| 2015/0321693 | A1* | 11/2015 | Buttner | F16F 1/128 |
| | | | | 180/440 |

FOREIGN PATENT DOCUMENTS

| | | | | |
|---|---|---|---|---|
| DE | 202005020640 U1 | 6/2006 | | |
| DE | 102006006141 A1 | 8/2007 | | |
| DE | 102012205641 A1 | 10/2013 | | |
| DE | 102012218045 A1 | 6/2014 | | |
| DE | 202016105189 U1 | 10/2016 | | |
| DE | 102015224599 A1 * | 6/2017 | ........... | B62D 7/1509 |
| DE | 102017108378 B4 * | 4/2020 | ........... | B62D 5/0418 |
| EP | 2314469 A2 * | 4/2011 | ........... | B60G 13/003 |
| EP | 3093217 A1 * | 11/2016 | ............ | B62D 7/144 |
| FR | 1521618 A * | 4/1968 | ............ | B60G 11/48 |
| FR | 2876974 A1 | 4/2006 | | |
| WO | 0222429 A1 | 3/2002 | | |
| WO | WO-2014048621 A * | 4/2014 | ............ | B60G 3/145 |

OTHER PUBLICATIONS

International Application No. PCT/EP2018/068949, International Search Report dated Jan. 4, 2019, 24 pages.

* cited by examiner

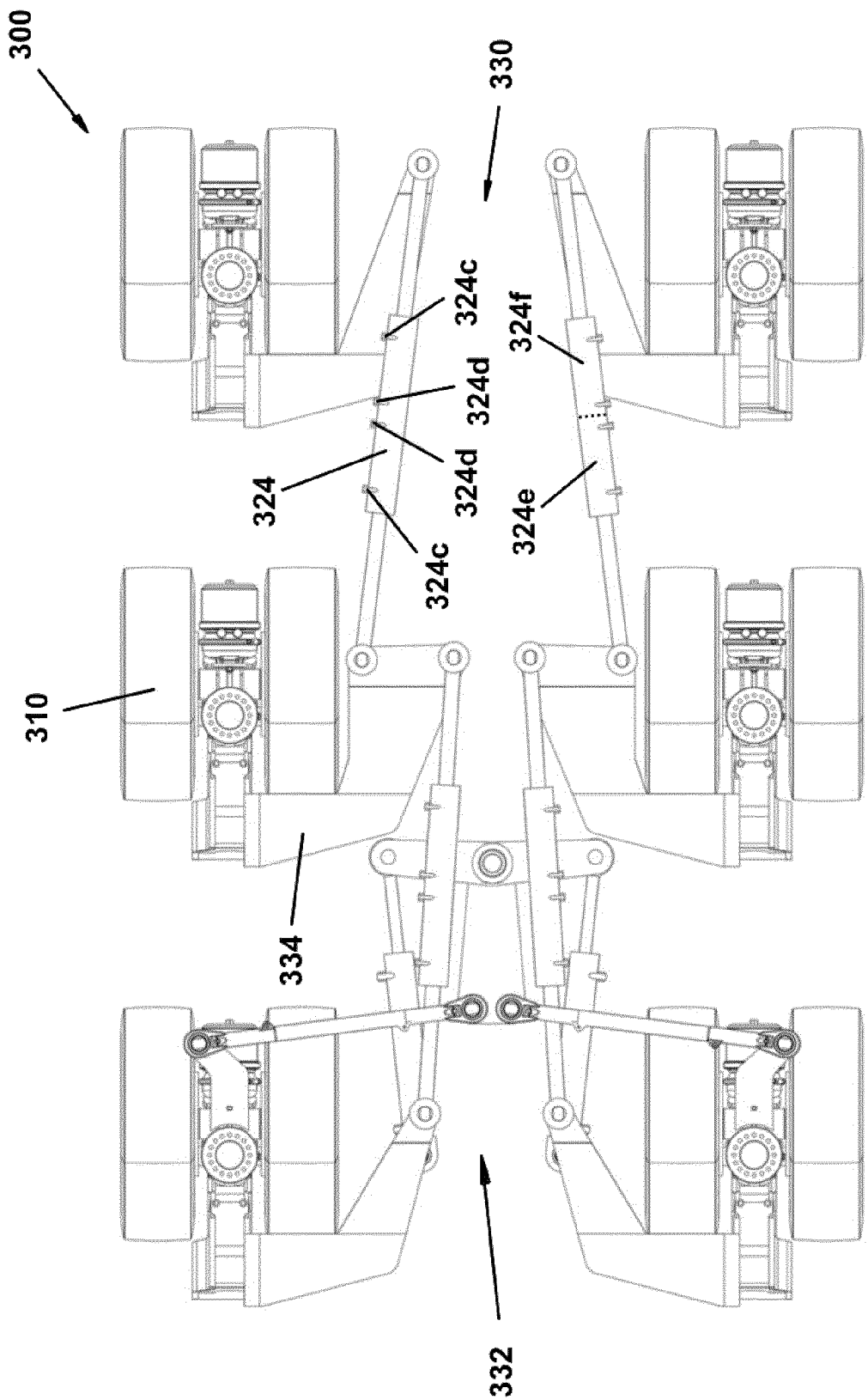

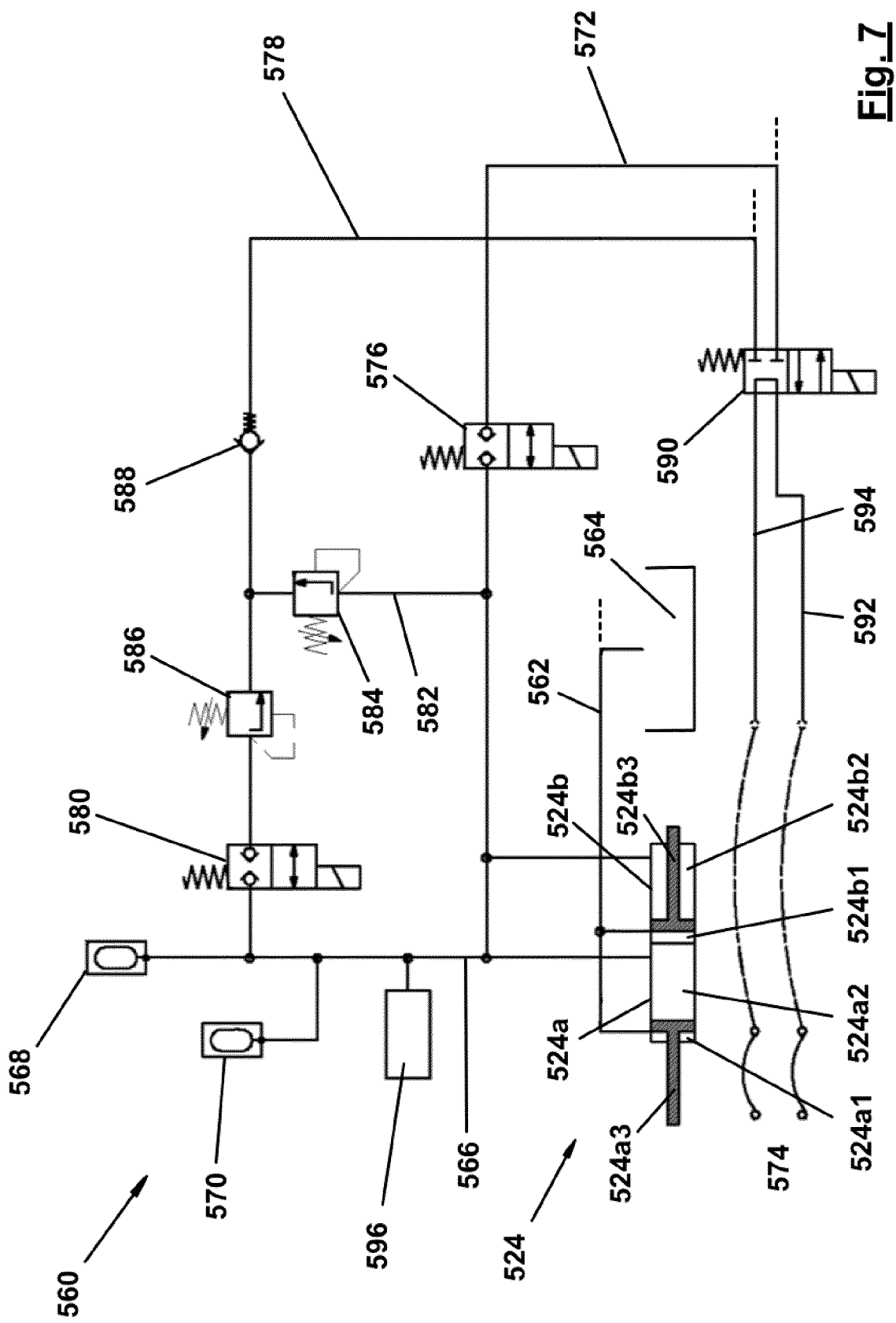

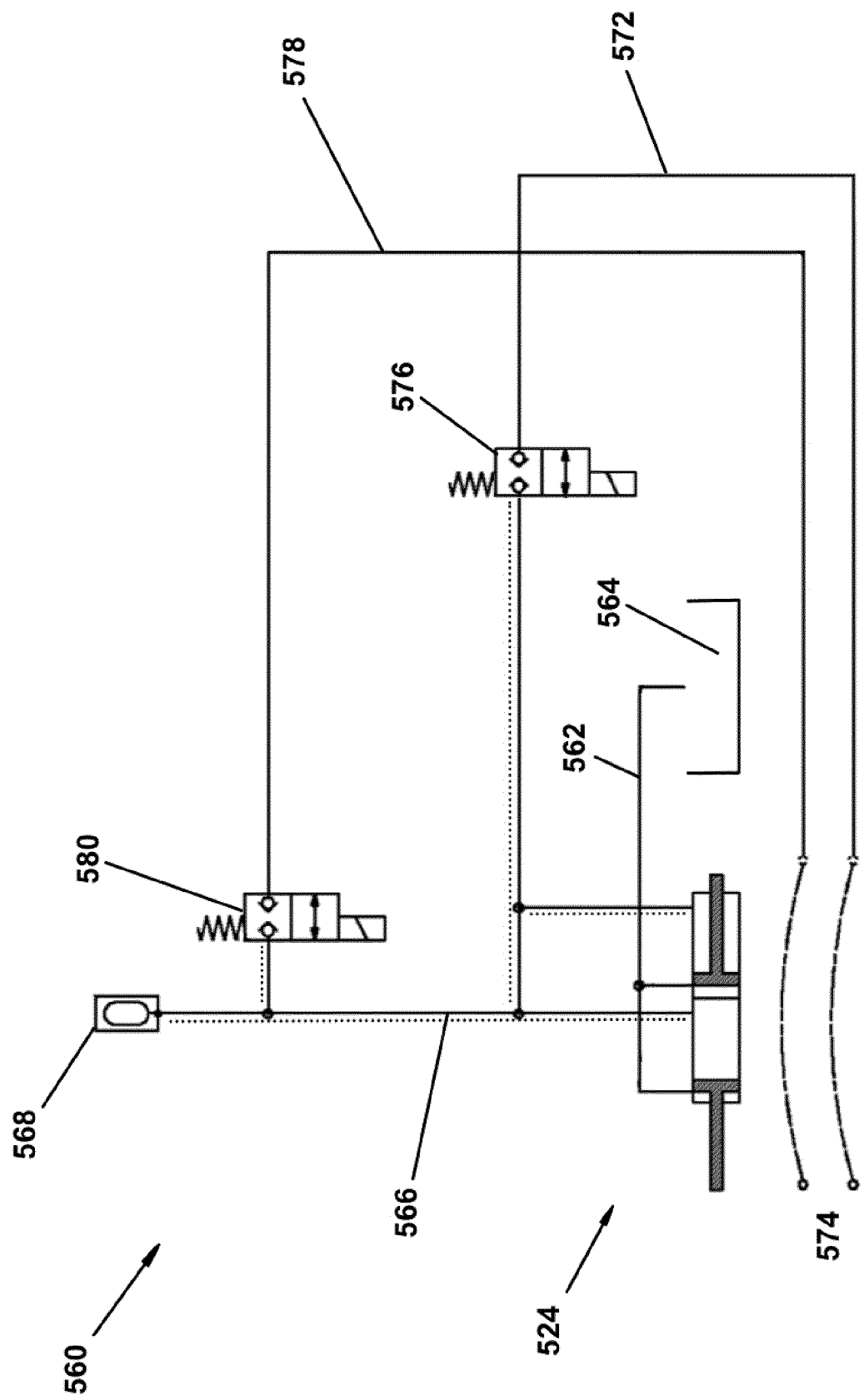

AXLE ASSEMBLY FOR A HEAVY GOODS VEHICLE, HEAVY GOODS VEHICLE COMPRISING AT LEAST ONE AXLE ASSEMBLY OF THIS KIND, AND HYDRAULIC ARRANGEMENT, IN PARTICULAR FOR ADJUSTING AN ADJUSTABLE UNIT THAT IS FORMED AS A CYLINDER-PISTON ARRANGEMENT

CROSS REFERENCE TO RELATED APPLICATION

This application claims priority to German Patent Application No. 10 2017 212 127.0, filed in Germany on Jul. 14, 2017, the entire contents of which are hereby incorporated herein by this reference.

DESCRIPTION

The invention relates to an axle assembly which is designed and intended to be used in a heavy goods vehicle, the axle assembly comprising a pivot bearing having a substantially vertically extending steering rotational axis, a wheel support that is arranged so as to be rotatable about the steering rotational axis and comprises at least one wheel that is mounted thereon so as to be rotatable about the wheel rotational axis, the wheel rotational axis extending substantially horizontally and, in the case of straight travel, transversely to the travel direction, and a unit that is adjustable about the steering rotational axis when the wheel support is rotated.

The invention further relates to a heavy goods vehicle comprising at least one axle assembly of this kind.

It should be noted at this point that the heavy goods vehicle, for which the axle assembly according to the invention is to be designed, in structural terms, can be both a motor-driven heavy goods vehicle and a pulled heavy goods vehicle, for example a heavy goods trailer or a "trailer for heavy goods transport" as referred to in Annex XI of the EC Guidelines 2007-46-EC in the version of Jul. 15, 2011, i.e. according to the definition specified therein for this term, a class O4 vehicle for transporting undividable loads (for example rotor blade for wind turbines) which, owing to the dimensions thereof are subject to speed and traffic restrictions, modular trailers also being included in this, irrespective of the number of the modules. It should furthermore be noted that, even in the case of the motor-driven heavy goods vehicles, not all of the axle assemblies need to be motor-driven.

Furthermore, heavy goods vehicles within the meaning of the present invention are intended to refer only to such vehicles where the load for which each individual axle assembly has to be designed has a value of at least 5 tonnes, preferably at least 6 tonnes.

Depending on the load to be transported in each case, heavy goods vehicles of this kind often comprise a large number of axle assemblies, which in turn results in a significant length of the heavy goods vehicle. Furthermore, the length of the heavy goods vehicle may differ from one use to another; for example, it may be able to be varied by means of a telescopic central longitudinal member or by arranging a loading bridge or further components of this kind. The significant length makes it more difficult to adjust the individual axle assemblies to the optimal steering angle of rotation, in each case, about the steering axle, during cornering.

Although this could in principle be achieved by a steering system in which each axle assembly is assigned a steering force generation device, for example a pneumatically and/or hydraulically actuatable cylinder-piston assembly and/or an electromotively actuatable force device, such as a spindle drive, which is actuated by a central control unit within the meaning of setting the axle assembly to the steer angle that is determined by the control unit and is optimal in each case. However, in practice steering systems of this kind have not gained acceptance, owing to the high production costs thereof.

It has furthermore already been proposed in the past, with the same aim, to use friction-steered axle assemblies, i.e. axle assemblies in which the wheel support is freely rotatable about the steering rotational axis, and the wheel rotational axis is arranged behind the steering rotational axis, in the travel direction, during straight travel, such that the optimal steering angle of rotation is automatically set in each case, as a result of the friction of the at least one wheel on the carriageway. In this case, however, it is problematic that it is inherent to the principle of friction steering that the axle assembly rotates about 180° when switching from forward travel to reverse travel, but the installation space required therefor is not available in the case of heavy goods vehicles. Therefore, during reverse travel, the friction-steered axles had to be blocked in a steering angle of rotation corresponding to straight travel. However, in the case of cornering this resulted in "grinding" of the wheel on the carriageway, leading to increased wear on the tyres of the wheels. Therefore, friction-steered axle assemblies gained acceptance in heavy goods vehicles either.

Therefore, in practice, steering systems are generally used in which a plurality of steering bogies are mechanically interconnected by means of a pitman arm linkage, the pitman arm linkage setting the steer angle of mutually adjacent axle assemblies, in the longitudinal direction of the heavy goods vehicle, to correspondingly adjusted steer angles, depending on a steer angle that is specified on the entry side. However, the gear transmission ratios specified by the pitman arm linkage can be optimised only for individual steering situations, resulting, in all other steering situations, in steer angles that are more or less optimal compromise. This solution also does not make it possible to prevent the tyres of the wheels from "grinding" on the carriageway.

The object of the invention is that of providing an axle assembly that is improved with respect thereto or a heavy goods vehicle that is improved with respect thereto.

This object is achieved according to the invention by an axle assembly which is designed and intended to be used in a heavy goods vehicle, the axle assembly comprising a pivot bearing having a substantially vertically extending steering rotational axis, a wheel support that is arranged so as to be rotatable about the steering rotational axis and comprises at least one wheel that is mounted thereon so as to be rotatable about the wheel rotational axis, the wheel rotational axis extending substantially horizontally and, in the case of straight travel, transversely to the travel direction, and the wheel rotational axis being arranged behind the steering rotational axis, in the travel direction, in every deflection state of the axle assembly, during straight travel, and a unit that is adjustable about the steering rotational axis when the wheel support is rotated, the adjustable unit being adjustable between two operating states, specifically a forwards travel operating state in which it influences the rotational movement of the wheel support about the steering rotational axis, and a reverse travel operating state in which it introduces a steering force into the axle assembly.

This makes it possible to operate the axle assembly according to the invention as a friction-steered axle assembly, during forwards travel, the adjustable unit functioning as a damping unit which, for example during travel at high speed, prevents "shimmying" of the friction-steered axle assembly in the peripheral direction, about the steering rotational axis, as is known for example from the wheels of shopping trolleys that are pushed too fast. In contrast, in the case of reverse travel the axle assembly according to the invention can be operated as a positively steered axle assembly, it being possible for the steering force required therefor to be introduced into the axle assembly via the adjustable unit. As a result, the "shimmying" of the at least one wheel on the carriageway can be substantially completely prevented during forwards travel and can be at least largely prevented during reverse travel.

The damping required for the forwards travel can be provided for example in that the adjustable unit comprises two or more elements that are adjustable relative to one another, at least two of said adjustable elements being in frictional contact with one another, and/or in that the adjustable unit comprises a cylinder-piston arrangement comprising a throttle. The damping effect can be achieved both mechanically and fluidically, i.e. pneumatically and/or hydraulically.

According to a first alternative embodiment, the positive steering of the axle assembly according to the invention can be achieved, during reverse travel, for example in the manner explained above for the example of forwards travel of heavy goods vehicles, i.e. for example in that the mutually adjustable elements of the adjustable unit are connected to form an intrinsically rigid unit in the reverse travel operating state. The adjustable unit can thus form a type of "steering rod" of a pitman arm linkage, which sets the steer angle of axle assemblies that are adjacent to one another in the longitudinal direction of the heavy goods vehicle, to correspondingly adjusted steer angles, on the basis of a steer angle specified at the entry side, by means of a corresponding selection of the position of the articulation points on a pitman arm that is connected to the pivot bearing of the axle assembly in an operationally fixed manner.

It should be noted that, owing to the fact that the adjustable units in said first embodiment are each arranged between two adjacent axle assemblies, one adjustable unit considered can also be associated with two axle assemblies.

Both the damping function in the forwards travel operating state, and the rigid arrangement in the reverse travel operating state can be provided, in a simple manner, in that the adjustable unit is designed as a cylinder-piston arrangement. In the forwards travel operating state, the work chambers of the cylinder-piston arrangement are interconnected by means of a throttle portion, which ensures the necessary damping. In contrast, in the reverse travel operating state, the cylinder-piston arrangement can be set into a state in which it is no longer possible to exchange operating fluid between the two work chambers.

Since it is simplest to block cylinder-piston arrangements in an extreme position, i.e. either in the maximally lengthened position or in the maximally shortened position, it is preferable for the cylinder-piston arrangement to comprise two cylinder-piston units, the ends of which that are opposite the piston rod outlet end in each case are interconnected in an operationally fixed manner. Specifically, in this case the cylinder-piston arrangement can be set, in a simple manner, to a medium length that corresponds to straight travel, by means of one cylinder-piston unit being set in the fully extended position, and the other cylinder-piston unit being set in the fully retracted position.

However, as an alternative thereto it is also possible to mechanically block the cylinder-piston arrangement in a position of medium length, for example using at least one bolt.

According to a second alternative embodiment, in the case of reverse travel the positive steering of the axle assembly according to the invention can, however, also be provided by means of the adjustable unit being designed as a steering force generation unit. For this purpose, the cylinder-piston arrangement can be designed for example as a cylinder-piston assembly, i.e. as a cylinder-piston arrangement which is actively supplied with operating fluid, for example by a fluid pump, in order for it to be possible for the steering rotational movement of the axle assembly to be performed.

Compared with a fluidically actuatable steering force generation apparatus both for forwards travel and for reverse travel, a fluidically actuatable steering force generation apparatus only for reverse travel can be provided more cost-effectively, since it does not need to meet the legal requirements for steering systems, which requirements in particular demand a dual-circuit design of the steering system. Specifically, these legal requirements apply only for operating states having speeds of more than 25 km/h, while heavy goods vehicles generally move significantly more slowly during reverse travel, usually at speeds of no more than 10 to 15 km/h. The steering force generation apparatus of the axle assembly according to the invention therefore needs to be designed having only a single circuit. Said apparatus can thus be designed more simply and therefore provided more cost-effectively than a dual-circuit steering force generation apparatus as is used in heavy goods vehicles of the prior art.

Although it is in principle conceivable, in a development of the invention, for the adjustable unit to be arranged behind the steering rotational axis in the forwards travel direction, for reasons of the available installation space it is preferable for the adjustable unit to be arranged in front of the steering rotational axis in the forwards travel direction.

In order to also be able to achieve steer angles of ±65° or more, relative to the steering position in straight travel in the forwards direction which corresponds to a steer angle of 0°, it is proposed for the free end of the adjustable unit to engage on a transmission lever, to which one end of a steering rod is hinged, the other end of which rod is connected to the pivot bearing. This embodiment is characterised by a particular compact design. However, as an alternative thereto it is also possible, for example, for the adjustable unit to be designed so as to be telescopic.

According to a second alternative embodiment, the free end of the adjustable unit can be designed to be fastened to the frame of the heavy goods vehicle. It is also possible, however, according to the invention, to combine the construction principles of the two alternative embodiments, for example in that the free end of the adjustable unit is designed to be connected to an adjacent axle assembly. In this way, a portion of the steering movement of the axle assembly according to the invention tapped from the steering linkage of the positively steered axle assembly/assemblies, such that the adjustable unit merely needs to generate corrective steering movements, in order to set the axle assembly according to the invention to the suitable steer angle in each case.

At this point it should be noted that the solution according to the invention is not restricted to a specific construction type, but can instead be used in any desired type of axle assembly.

For example, the solution according to the invention can be used in what are known as swing axle assemblies. This construction type comprises a bogie that rigidly connected to the pivot bearing and at the free end of which a swing arm is arranged so as to be pivotable about a substantially horizontally extending pivot axis, the wheel support being pivotably arranged at the free end of the swing arm.

It is also possible, however, to use the solution according to the invention in steering knuckle-hinged axle assemblies, for example in the construction type comprising a MacPherson independent suspension, as disclosed in DE 10 2012 205 641 A1 by the applicant.

Furthermore, the solution according to the invention can also be used in axle assemblies of other construction types. For example, they can be used in a construction type in which a wheel support that is arranged so as to be rotatable about a substantially vertical steering rotational axis is rigidly attached to a free end of a swing arm of the type described above, or to a wheel suspension of a different design. Furthermore, the invention can also be used in differing construction types of steering knuckle-hinged axle assemblies comprising an independent suspension, or also in such construction types which do not comprise an independent suspension, but rather steerable wheels that are interconnected by means of a rigid axle body.

According to a further aspect, the invention furthermore relates to a heavy goods vehicle comprising at least one axle assembly according to any of the preceding claims. With respect to the advantages of said heavy goods vehicle, reference is made to the above discussion of the axle assembly according to the invention.

In a development of said heavy goods vehicle, it may be possible for said vehicle to comprise a dual-circuit steering system comprising two mutually redundant steering circuits, and for a controller of the dual-circuit steering system to be designed and intended for actuating a valve assembly of the dual-circuit steering system such that, in the event of reverse travel of the heavy goods vehicle, only one of the steering circuits is supplied with operating fluid. In this case, it is preferable for sometimes one steering circuit and sometimes the other steering circuit to be supplied with operating fluid. As a result of this measure/these measures, the service life of the dual-circuit steering system can be extended, since one of the two steering circuits is always rested during reverse travel.

The invention will be described in greater detail in the following on the basis of the accompanying drawings, with reference to some embodiments. In the drawings.

Figure 6A:
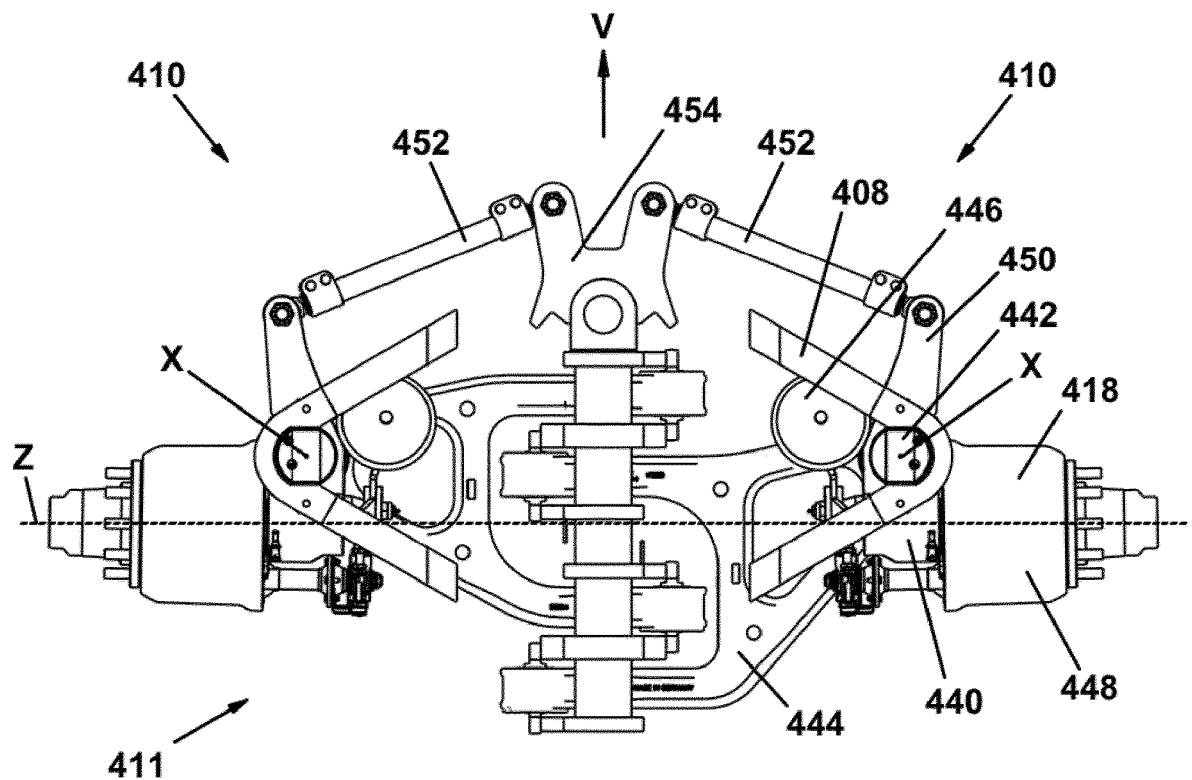
Figure 6B:
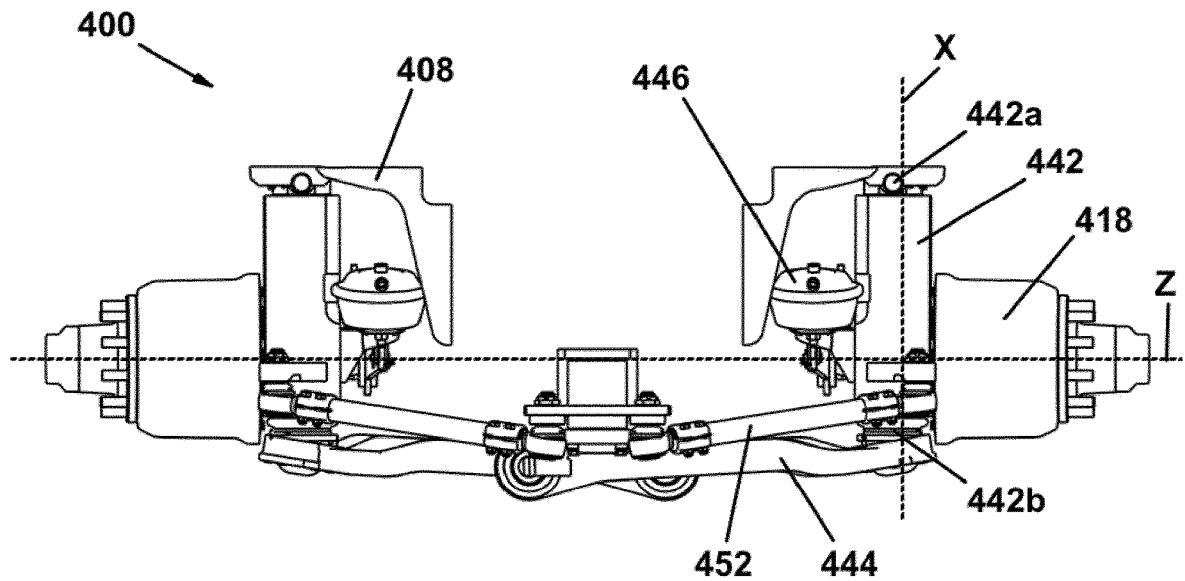

FIG. 5 is a plan view of a further embodiment of an axle assembly according to the invention, in which the adjustable unit for reverse travel operation comprises both features of an active steering force generation unit and features of a passive steering force application unit; and FIGS. 6a and 6b are a plan view (FIG. 6a) and a front view (FIG. 6b) of a further embodiment of an axle assembly according to the invention which, in a manner differing from the other embodiments, is not designed as a swing axle assembly but rather as a steering knuckle-hinged axle assembly comprising a MacPherson independent suspension.

Figure 8B:
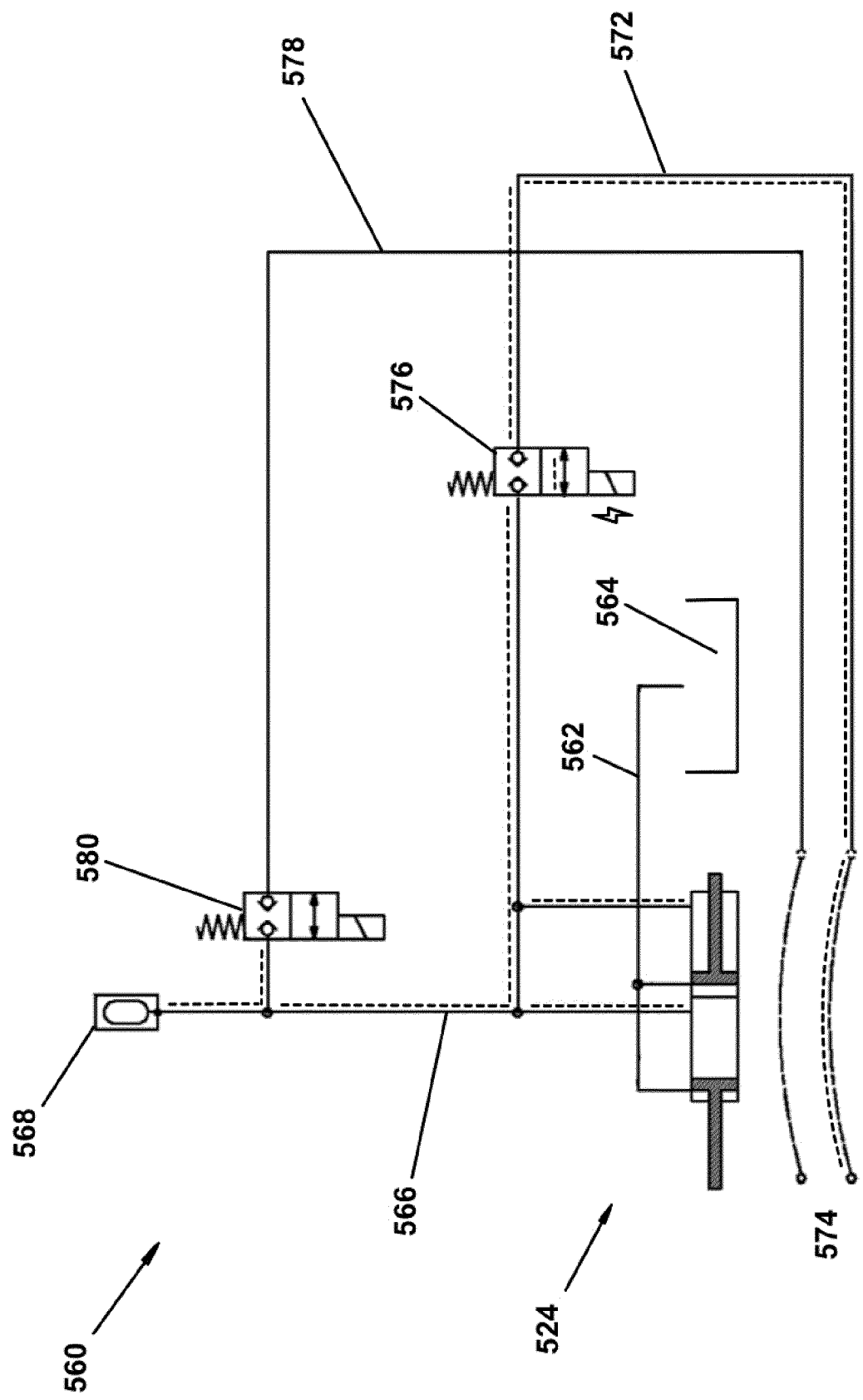
Figure 8C:
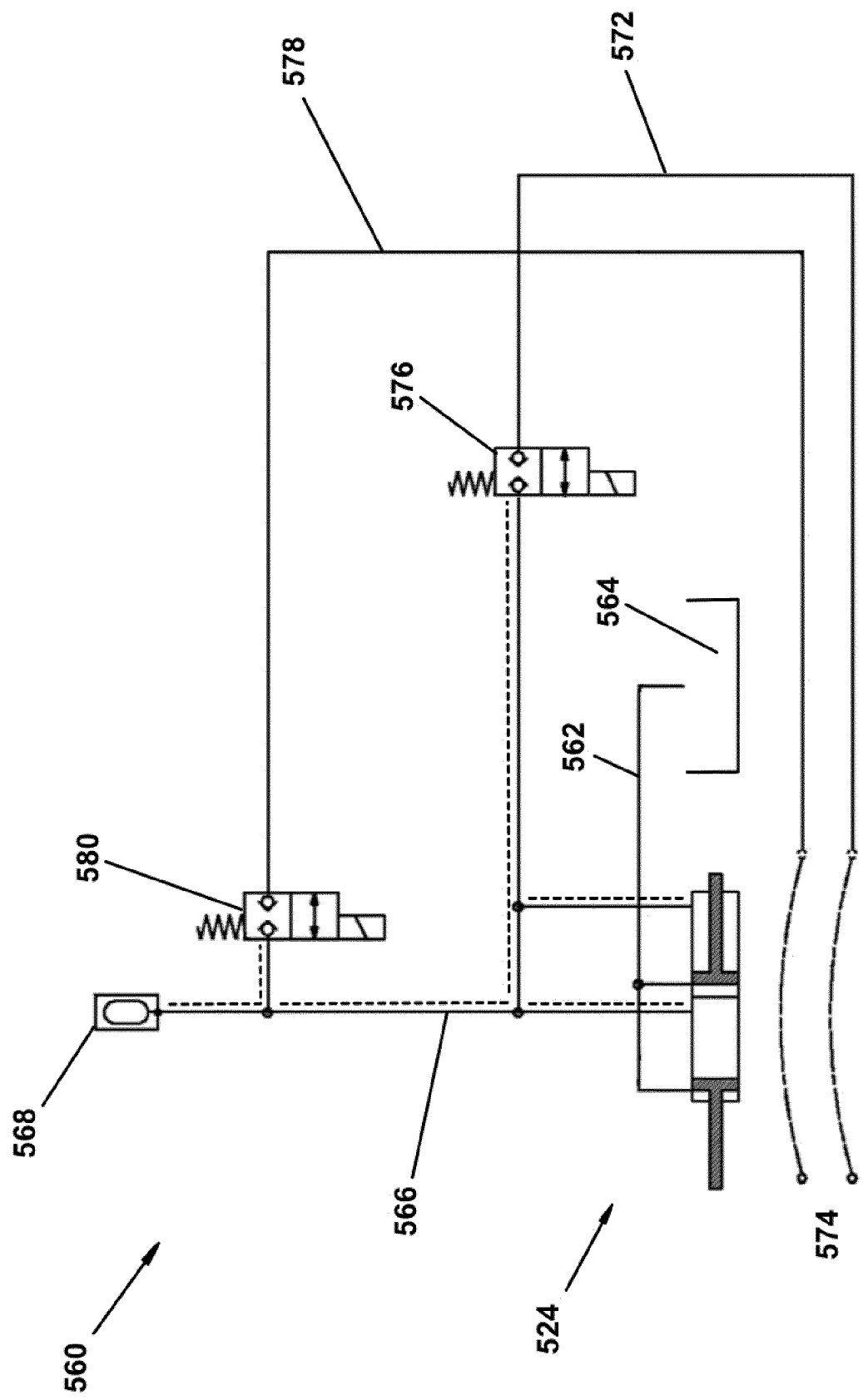
Figure 8D:
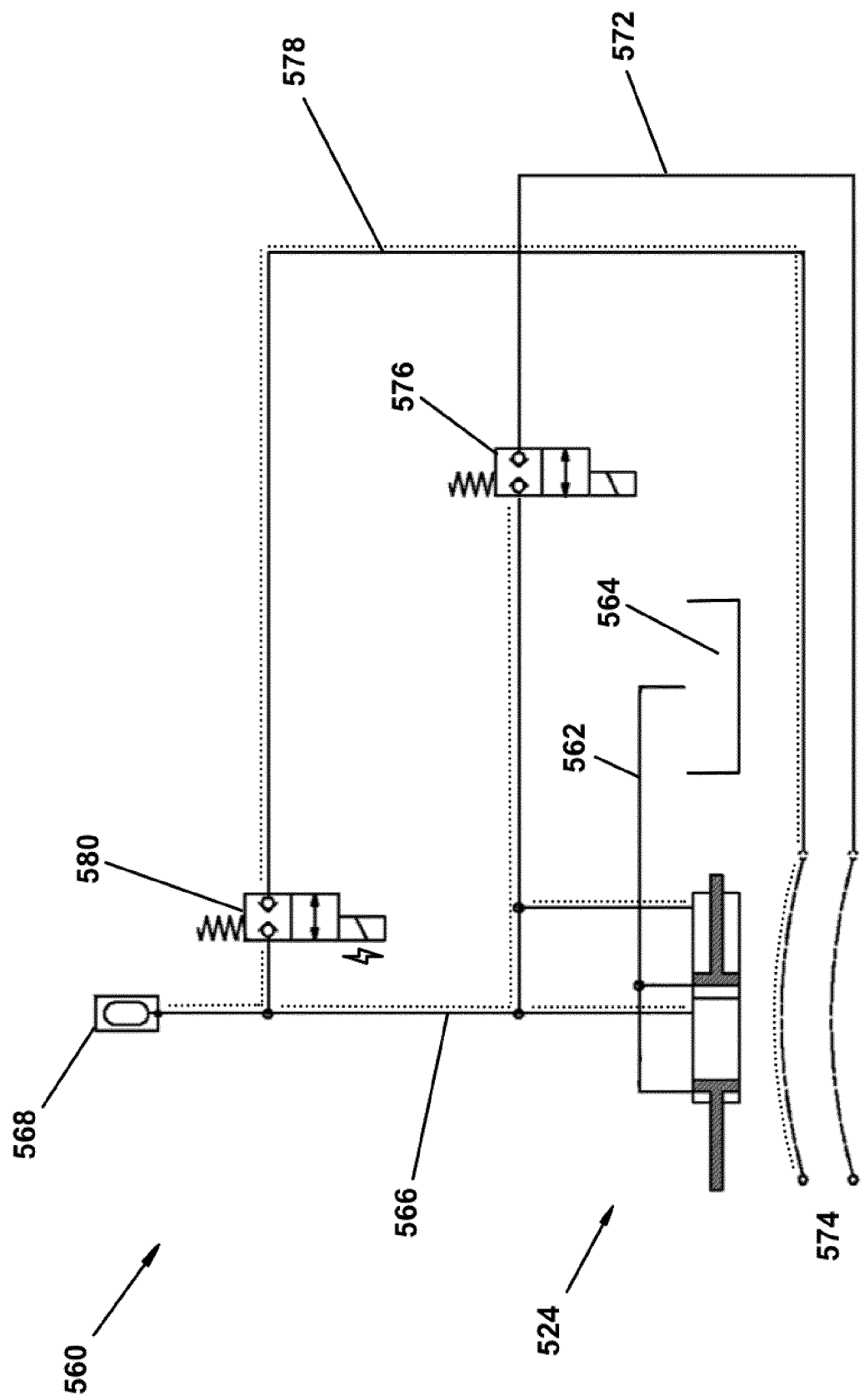

FIG. 7: is a schematic view of an embodiment of a hydraulic arrangement according to the invention; and FIG. 8a to 8d: are simplified schematic views of the hydraulic arrangement according to FIG. 7 in order to illustrate the function of the hydraulic arrangement according to FIG. 7 in a forwards travel operating state (FIG. 8a), when switching from the forwards travel operating state to the reverse travel operating state (FIG. 8b), during the reverse travel operating state (FIG. 8c), and when switching from the reverse travel operating state to the forwards travel operating state (FIG. 8d).

Figure 1:
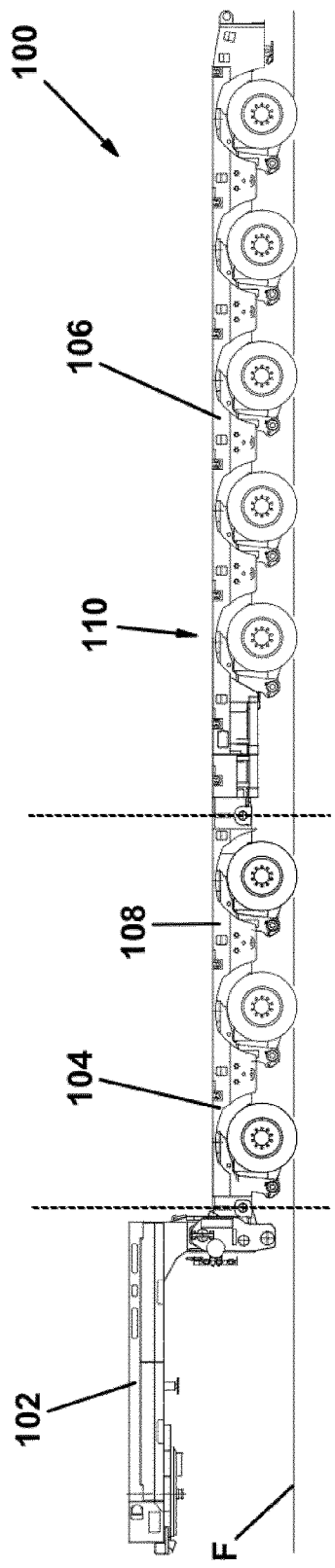
FIG. 1 is a side view of an example of a heavy goods vehicle according to the invention, specifically a modular heavy goods semi-trailer.

In FIG. 1, a heavy goods vehicle according to the invention is denoted very generally by 100. In the embodiment shown, the heavy goods vehicle 100 is designed as a modular semi-trailer. For this purpose, the semi-trailer 100 comprises a gooseneck module 102, a pusher vehicle module 104 and a towed vehicle module 106. In addition, a further module can be arranged for example between the pusher vehicle module 104 and the towed vehicle module 106, for example a loading bridge or a telescopic central longitudinal member which allows for the length of the semi-trailer 100 to be adjusted to the length of the load to be transported in each case.

The semi-trailer 100 comprises a plurality of axle assemblies 110 which, in the embodiment shown in FIG. 1, are designed as swing axle assemblies. At this point, it should be noted that the pusher vehicle module 104 and the towed vehicle module 106 could also comprise a different number of axle assemblies 110 than that shown in FIG. 1.

Figure 2D:
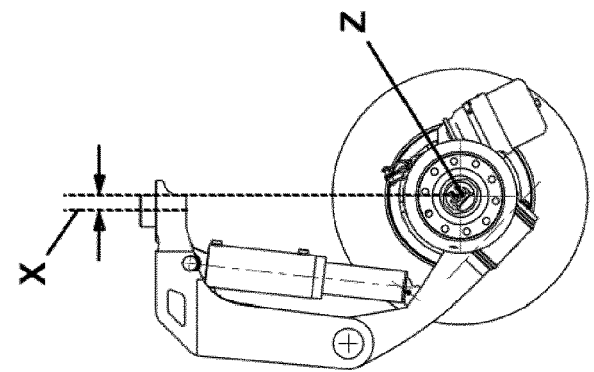
FIGS. 2a to 2d are side views of an embodiment, by way of example, of an axle assembly according to the invention, specifically a swing axle assembly.
Figure 2C:
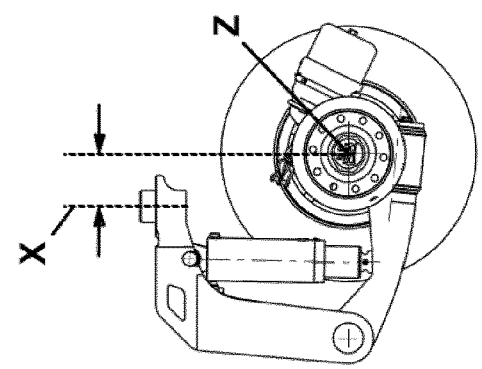
Figure 2B:
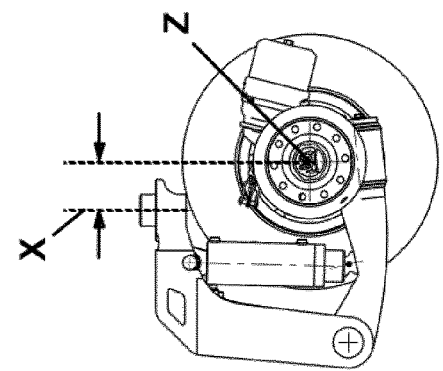
Figure 2A:
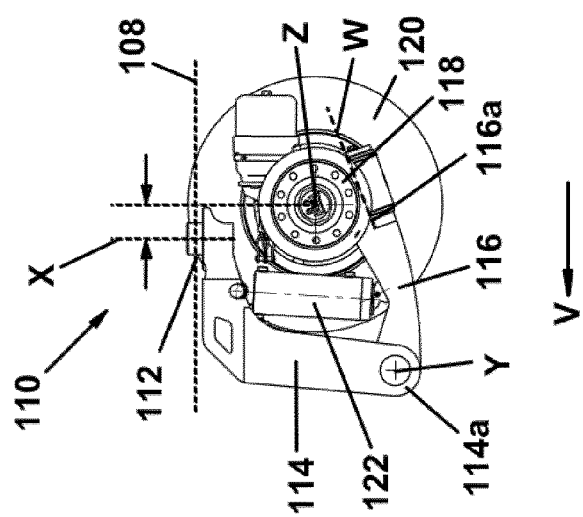

With reference to FIG. 2a, the swing axle assembly 110 comprises a pivot bearing 112 having a substantially vertically extending steering rotational axis X, a bogie 114 which is rigidly connected to the pivot bearing 112 and at the free end 114a of which a substantially horizontally extending swing arm 116 is arranged, and a wheel support 118 which is arranged at the free end 116a of the swing arm 116 so as to be pivotable about an axis W, wheels 120 assigned to the wheel support 118 being mounted thereon so as to be rotatable about a wheel rotational axis Z. Furthermore, a cylinder-piston assembly 122 which acts between the bogie 114 and the swing arm 116 is provided, which assembly can be fluidically, i.e. pneumatically and/or hydraulically, adjusted, such that the wheels 120 can be arranged at different spacings relative to the frame 108 of the heavy goods vehicle 100 (indicated merely schematically in FIG. 2a) (see FIGS. 2a to 2d), in order to be able to compensate unevenness of the carriageway F.

As shown in FIGS. 2a to 2d, the swing axle assembly 110 for forwards travel operation is designed as a friction-steered axle assembly. For this purpose, the axle assembly 110 is constructed such that, during straight travel (steer angle) 0°, the wheel rotational axis Z is always arranged behind the steering rotational axis X, in the forwards travel direction V, irrespective of the pivot state of the swing arm 116 about the pivot axis Y. In this way, the axle assembly 110 can automatically be set to the optimal steer angle in each case, in the case of cornering, under the influence of the friction force exerted by the wheels 120 on the carriageway F. It is therefore in particular not necessary to actively introduce steering forces into the axle assembly 110 for the purpose of forwards travel operation.

Figure 3E:
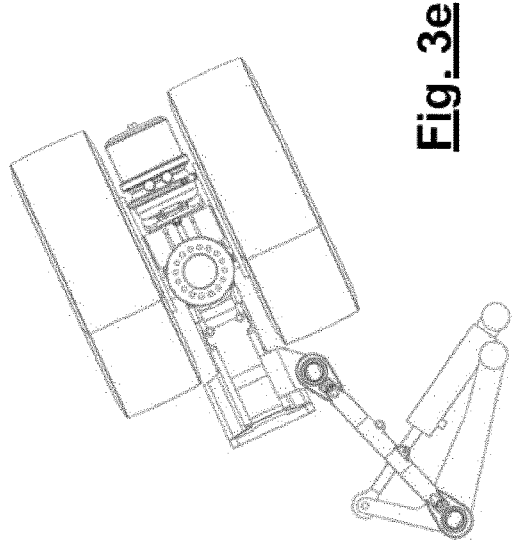
FIGS. 3a to 3e are plan views of an embodiment of an axle assembly according to the invention, in which the adjustable unit for reverse travel operation is designed as an active steering force generation unit.
Figure 3D:
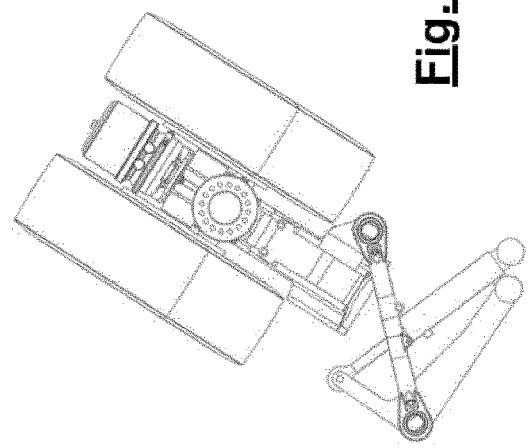
Figure 3C:
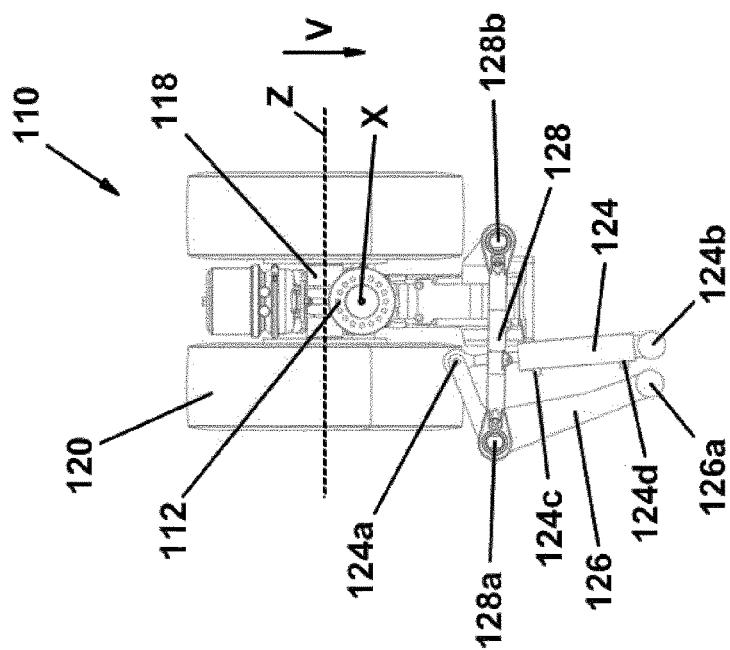
Figure 3A:
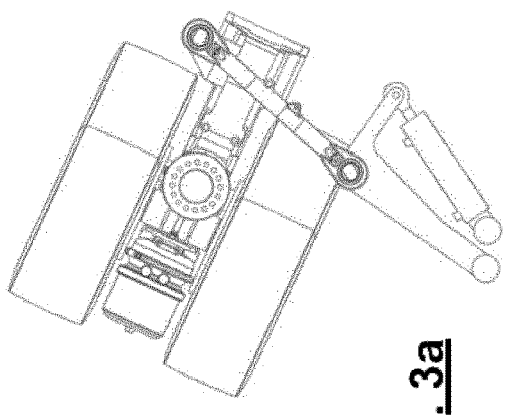
Figure 3B:
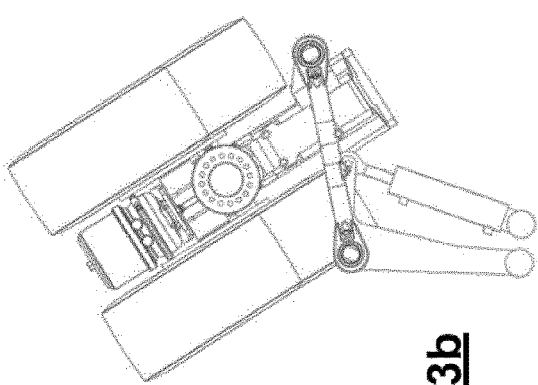

Since friction-steered wheels tend to "shimmy" during fast travel, the axle assembly 110 is, as shown in FIG. 3c, associated with a damping device 124. In the embodiment shown, the damping device 124 is designed as a cylinder-piston unit, the working spaces (not shown) of which are interconnected by a throttle which ensures a damping force that prevents the "shimmying" when the piston separating the working spaces from one another moves in the cylinder.

As shown in FIG. 3c, the free end 124a of the cylinder-piston unit 124 engages on a transmission lever 126, to which one end 128a of a steering rod 128 is rotatably hinged, the other end 128b of which steering rod is rotatably connected to the pivot bearing 112 of the axle assembly 110. As can be seen in FIGS. 3a to 3e, in this way steer angles of from −65° to +65° can be made possible by adjusting the cylinder-piston unit 124 between the maximally shortened position thereof (see FIG. 3a) and the maximally lengthened position thereof (see FIG. 3e).

It should also be added that both the transmission lever 126 is hinged, at 126a, and the cylinder-piston unit 124 is hinged, at 124b, to the frame 108 of the heavy goods vehicle 100.

In reverse travel operation, the cylinder-piston unit 124 can be operated as a steering force generation unit, i.e. as a cylinder-piston assembly to which gaseous and/or liquid operating fluid, i.e. for example compressed air and/or hydraulic oil, is supplied via the connections 124c and 124d (see FIG. 3a), in order to generate a steering force that transfers the axle assembly 110 into the steering rotational position, desired in each case, about the steering rotational axis X.

The cylinder-piston unit 124 thus forms a first embodiment of an adjustable unit within the meaning of the present invention.

Figure 4:
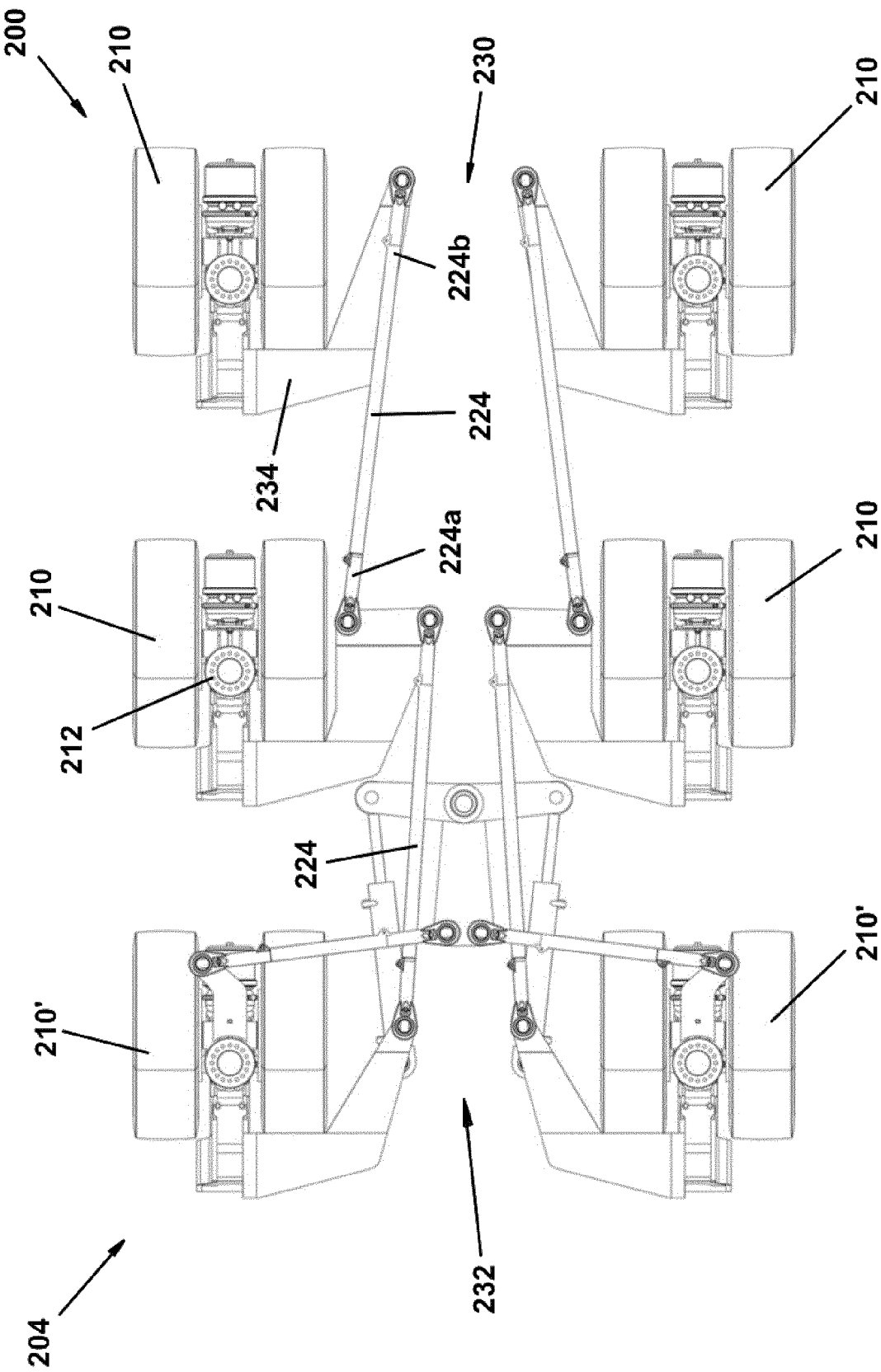
FIG. 4 is a plan view of a further embodiment of an axle assembly according to the invention, in which the adjustable unit for reverse travel operation is designed as a passive steering force generation unit in each case.

FIG. 4 shows a further embodiment of a heavy goods vehicle according to the invention comprising axle assemblies according to the invention. The design of the embodiment in FIG. 4 corresponds, to a large degree, to that of the embodiment of FIGS. 2a to 2d and 3a to 3e. Therefore, in FIG. 4 analogous parts are provided with the same reference signs as in FIGS. 2a to 2d and 3a to 3e, but increased by 100. Furthermore, the embodiment in FIG. 4 will be described in the following only insofar as it differs from the embodiment of FIGS. 2a to 2d and 3a to 3e, to the description of which reference is otherwise hereby explicitly made.

In the case of the heavy goods vehicle 200 of FIG. 4, the adjustable units 224 of the axle assemblies 210 for reverse travel operation are designed as rigid steering rods of a steering linkage 230 which relays a steer angle, specified by a steering force generation unit 232, in accordance with a predetermined gear transmission ratio, from axle assembly to axle assembly. For this purpose, the steering rods 224 are hinged to pitman arms 234 which are connected to the bogies 212 of the axle assemblies 210 in an operationally fixed manner.

This type of positive steering is the type of steering for forwards travel operation that is currently used most frequently in the applicant's heavy goods vehicles.

However, according to the invention, this type of positive steering is used only for reverse travel operation. On the other hand, friction steering is used for forwards travel operation.

For this purpose, the steering rods 224 are designed so as to be telescopic, the two element 224a and 224b that form the steering rod 224 interacting with one another in a frictional manner, in order to provide the damping force required for preventing "shimmying" in the event of relative movement.

It should also be added that not all the axle assemblies of the pusher vehicle module 204 of the heavy goods vehicle 200, shown in FIG. 4, are designed as axle assemblies 210 that are friction-steered in forwards travel operation. Specifically, this is not permissible pursuant to the relevant regulations. Instead, said regulations demand that at least half of the axle assemblies of the overall heavy goods vehicle 200 must be designed as positively steered axle assemblies. Therefore, in the embodiment according to FIG. 4 two axle assemblies 210 are provided which are positively steered, under the influence of the steering force generation unit 232, even in forwards travel operation.

FIG. 5 shows a further embodiment of a heavy goods vehicle according to the invention comprising axle assemblies according to the invention. The design of the embodiment in FIG. 5 corresponds, to a large degree, to that of the embodiment of FIG. 4. Therefore, in FIG. 5 analogous parts are provided with the same reference signs as in FIG. 4, but increased by 100, i.e. increased by 200, compared with FIGS. 2a to 2d and 3a to 3e. Furthermore, the embodiment in FIG. 5 will be described in the following only insofar as it differs from the embodiments of FIGS. 2a to 2d and 3a to 3e, and/or 4, to the description of which reference is otherwise hereby explicitly made.

The adjustable units 324 of the axle assemblies 310 of the heavy goods vehicle 300 combine features of the adjustable units 124 of the embodiment of FIGS. 2a to 2d and 3a to 3e, and the adjustable units 224 of the embodiment of FIG. 4. On the one hand the connect the pitman arms 334 associated with the axle assemblies 310, in the manner of steering rods of a steering linkage 330, so as to relay a steer angle, generated by a steering force generation unit 332, from axle assembly to axle assembly, in accordance with a predetermined gear transmission ratio. On the other hand, they are designed as cylinder-piston assemblies to which operating fluid can be supplied via connections 324c and 324d, such that they can in turn actively influence the steer angle of the axle assembly 310 associated therewith, for example in order to generate a corrective steer angle in order to prevent "grinding" of the wheels on the carriageway.

It is also possible, however, to use the supply of operating fluid via the connections 324c and 324d, in positively steered reverse travel operation, only in order to set the adjustable units 324 to a fixed medium length. Since it is simplest to fix cylinder-piston units in an extreme position, i.e. the fully shortened position or the fully lengthened position, in the embodiment according to FIG. 5 the adjustable units 324 are designed as dual cylinders, i.e. they comprise two cylinder-piston units 324e and 324, the ends of which that are opposite the outlet ends of the piston rods in each case are interconnected in an operationally fixed manner. In order to set the adjustable units 324 to a medium length, one cylinder-piston unit 324e is transferred into the fully shortened position, while the other cylinder-piston unit 324f is transferred into the fully lengthened position.

Irrespective of the way in which the adjustable units 324 are operated in conjunction with the positive steering in reverse travel operation, in friction-steered forwards travel operation they function as damping devices for preventing "shimmying".

It should also be added that, in all embodiments, the axle assemblies that are positively steered in forwards travel operation have the same fundamental structural design as the axle assemblies that are friction-steered in forwards travel operation, i.e. in particular, in the case of the axle assemblies that are also positively steered in forwards travel operation, too, the wheel rotational axis Z is always arranged behind the steering rotational axis X, with respect to the forwards travel direction V, in every deflection state of the swing arm.

It should be noted, at this point, that what are known as swing axle assemblies have been used in all the embodiments described above. However, this does not mean that the solution according to the invention is restricted to this type of axle assembly. Instead, it can advantageously be used in any desired design principle of axle assemblies, for example also in steering knuckle-hinged axle assemblies. This will be explained in greater detail in the following, with reference to FIGS. 6a and 6b, which show a friction-steered axle assembly comprising a MacPherson independent suspension. In this case, in FIG. 5 analogous parts are provided with the same reference signs as in FIGS. 2a to 2d and 3a to 3e, but increased by 300. Furthermore, the embodiment of FIGS. 6a and 6b will be described in the following only insofar as they differ from the embodiments of FIGS. 2a to 2d and 3a to 3e, 4 and 5, to the description of which reference is otherwise hereby explicitly made.

The fundamental structure of the MacPherson independent suspension is explained in detail in DE 10 2012 205 641 A1 by the applicant, to the description of which reference is hereby explicitly made, and which is incorporated, in this respect, as part of the disclosure of the present application.

According to FIGS. 6a and 6b, each of the axle assemblies 410 comprises a wheel support 418 which is connected to a cylinder-piston assembly 442 by means of a mounting assembly 440. The upper end 442a of the cylinder-piston assembly 442 is directly hinged to the frame 408 of the heavy goods vehicle 400, while the lower end 442b thereof is indirectly hinged to the frame 408 by means of the mounting assembly 440 and A-arms 444. Furthermore, the axle assemblies 410 also comprise a brake cylinder 446 which is connected to a brake mechanism 448 that is received in the wheel support 418.

Moreover, the mounting assembly 440 is designed having a pitman arm 450 which is connected to a steering means of the heavy goods vehicle 400 via a suspension arm 452. When the steering means is actuated, i.e. when the steering plate 454 is pivoted, the mounting assembly 440 is rotated about the steering rotational axis X which coincides with the axis of the cylinder-piston assembly 442. As can be seen in FIG. 6a, in the embodiment of FIGS. 6a and 6b too, the steering rotational axis X is arranged in front of the wheel rotational axis Z, in the forwards travel direction V, during straight travel, as is required for implementing friction steering. In this case it is important that any undesired steering moments which are additionally generated by the friction steering of the two axle assemblies 410 negate one another, since the suspension arms 452 of the axle assemblies 410 belonging to the same centre line 411 are supported on a common steering plate 454.

According to a further aspect, the invention furthermore relates to a hydraulic arrangement comprising a hydraulically actuatable cylinder-piston arrangement having at least one first work chamber and at least one second work chamber, a reservoir for hydraulic fluid that is substantially kept at a negative pressure and that is fluidically connected to at least one first work chamber of the cylinder-piston arrangement via a balancing line, a pressure reservoir that is fluidically connected to the at least one second work chamber via a connecting line, a fluid supply line for supplying hydraulic fluid to the connecting line, a supply check valve that is adjustable between a blocking position and an open position, the supply check valve allowing a supply of hydraulic fluid from an external source that is not part of the hydraulic arrangement to the connecting line when in an open position, while separating the external source from the connecting line when in the blocking position, and the supply check valve being a valve that is pre-loaded into the blocking position, a fluid release line for releasing hydraulic fluid from the connecting line to the external source, and a release check valve that is associated with the fluid release line and is adjustable between a blocking position and an open position, the release check valve allowing a release of hydraulic fluid from the connecting line when in the open position, while separating the external source from the connecting line when in the blocking position, and the release check valve being a valve that is pre-loaded into the blocking position.

A hydraulic arrangement of this kind can be used for example for operating a cylinder-piston arrangement that is used as an adjustable unit in an axle assembly of the type described above, for example the cylinder-piston arrangement 124 of the embodiment according to FIGS. 3a to 3e or the cylinder-piston arrangement 324 of the embodiment according to FIG. 5.

In this case, the cylinder-piston arrangement can, as explained above, comprise a dual cylinder, for example, specifically a cylinder having two interiors, each of which is divided, by a piston, into a first working space and a second working space, the piston rods connected to the two pistons emerging from the dual cylinder at mutually opposing ends of the cylinder-piston arrangement. In this case, it is preferably possible for the first working space, in one interior of the dual cylinder, to be penetrated by the associated piston rod, while the second working space, in the other interior of the dual cylinder, in each case, can be penetrated by the associated piston rod.

The hydraulic arrangement according to the invention is advantageous in that it makes it possible, in a simple manner, to ensure damping in the forwards travel operating state, which damping counteracts the shimmying of the axle assembly in the case of friction steering, while ensuring the rigid structure of the cylinder-piston arrangement that is required for positive steering, in the reverse travel operating state. In this case, the supply check valve needs to be supplied with energy only when switching from the forwards travel operating state to the reverse travel operating state, in order to transfer it into the open position thereof, while the release check valve needs to be supplied with energy only when switching from the reverse operating state to the forwards operating state, in order to transfer it into the open position thereof. However, both in the forwards travel operating state and in the reverse travel operating state the two check valves are kept in the respective blocking positions by means of the action of the pre-load thereof.

When switching from the forwards travel operating state to the reverse travel operating state, only the supply check valve is transferred into the open position thereof, in order to fluidically connect a high-pressure fluid line, connected to the external source, to the portion of the hydraulic arrangement formed by the cylinder-piston arrangement, pressure reservoir and connecting line. As a result, both the at least one second working space of the cylinder-piston arrangement, and the pressure reservoir, are filled with hydraulic fluid, such that the cylinder-piston arrangement forms a substantially rigid arrangement which allows either for fixing of the axle assembly in the straight travel direction, or for positive steering of the axle assembly, depending on whether the end of the cylinder-piston arrangement not connected to the axle assembly is connected to the frame of the heavy goods trailer (fixing in the straight travel direction) or to an adjacent axle assembly of the heavy goods trailer (positive steering). Filling the at least one second working space expels the hydraulic fluid from the at least one first working space and into the hydraulic fluid reservoir that is kept substantially at ambient pressure.

In order to protect the hydraulic arrangement from excessively high pressure values which could, at worst, lead to damage of the hydraulic arrangement, it is proposed for a pressure limiting valve to be arranged in a short circuit line that interconnects the fluid supply line and the fluid release line, which pressure limiting valve controls or limits the pressure in the portion of the hydraulic arrangement formed by the cylinder-piston arrangement, pressure reservoir and connecting line to a predetermined pressure value, when the supply check valve is set in the open position.

When switching from the reverse travel operating state to the forwards travel operating state, only the release check valve is transferred into the open position thereof, in order to fluidically connect a low-pressure fluid line, leading to the external source, to the portion of the hydraulic arrangement formed by the cylinder-piston arrangement, pressure reservoir and connecting line. As a result, the pressure reservoir is emptied, such that the piston(s) of the cylinder-piston arrangement can move freely in the forwards travel operating state. As a result of this movement, the pressure reservoir is periodically filled and periodically emptied. The associated flowing back and forth of the hydraulic fluid generates a damping force which counteracts the shimmying of the axle assembly.

In order to be able to ensure that the pressure level in the portion of the hydraulic arrangement formed by the cylinder-piston arrangement, pressure reservoir and connecting line is sufficient to be able to generate the required amount of damping force, it is proposed, in a development of the invention, that a pressure control valve should furthermore be arranged in the fluid release line, which valve controls the pressure in the portion of the hydraulic arrangement formed by the cylinder-piston arrangement, pressure reservoir and connecting line to a predetermined pressure value, when the release check valve is set in the open position.

It is readily clear from the above description that it is advantageous for the predetermined pressure value of the pressure control valve arranged in the fluid release line to be lower than the predetermined pressure value of the pressure limiting valve arranged in the short circuit line.

In order to be able to protect the pressure control valve and the pressure limiting valve from an inflow in a direction directed counter to the predetermined flow direction in the fluid release line, a non-return valve can, if necessary, furthermore be arranged in the fluid release line, and specifically at a point that is located between the external source and the release check valve and the pressure control valve arranged in the fluid release line, and preferably also the mouth of the short circuit line in the fluid release line.

In order to furthermore be able to account for the case in which the second working space of the cylinder-piston arrangement cannot be filled to the desired extent and/or completely with hydraulic fluid when switching from the forwards travel operating state into the reverse travel operating state, for example owing to a disturbing force acting on the piston during the pressure build-up, such that the piston cannot be extended or retracted into the desired position and/or completely, it is furthermore proposed for a further pressure reservoir to additionally be assigned to the connecting line, the pre-load of which pressure reservoir, by which it opposes the storage of hydraulic fluid therein, is of a higher value than that of the other pressure reservoir. As a result, it is possible to ensure that the second working space of the cylinder-piston arrangement can still continue to be filled with fluid even in the reverse travel operating state, when the two check valves are kept in the respective blocking positions under the action of the pre-load thereof, it being ensured at the same time that the pressure prevailing in the portion formed by the cylinder-piston arrangement, the pressure reservoir, the further pressure reservoir and the connecting line remains substantially unchanged, even in the event of a further movement of the cylinder.

In order to be able to monitor the proper operation of the hydraulic arrangement, the connecting line can furthermore be associated with a pressure display means.

Finally, it may be advantageous for a main check valve to be provided, which is adjustable between a blocking position and an open position and which is associated with the fluid supply line and the fluid release line, together, the main check valve connecting the external source both to the fluid supply line and to the fluid release line, in the open position, while separating both the fluid supply line and the fluid release line from the external source, in the blocking position, but interconnecting the two source-side line portions of the fluid supply line and the fluid release line, and the main check valve being a valve that is pre-loaded into the blocking position.

In this case, providing a main check valve of this kind can serve as a redundant safety device, for example in the event of a malfunction of the supply check valve and/or of the release check valve. Furthermore, connecting the two source-side line portions of the fluid supply line and the fluid release line can allow for depressurised circulation of the fluid supplied from the external source, in order to reduce heating of the supplied fluid resulting during the blocking position of the main check valve, which heating could result for example from a hydraulic pump associated with the external source, in particular in the event of said pump also operating while the main check valve is in the blocking position.

The further aspect of the invention will be described in greater detail in the following on the basis of the accompanying drawings, with reference to some embodiments.

In FIG. 7, an embodiment of a hydraulic arrangement according to the invention is denoted very generally by 560, which hydraulic arrangement can be used for example for operating a cylinder-piston arrangement 524 that is used as an adjustable unit in an axle assembly of the type described above.

According to FIG. 7 the cylinder-piston arrangement 524 is designed as a dual cylinder comprising two cylinder-piston units 524a, 524b. In this case, each cylinder-piston unit 524a, 524b of the dual cylinder 524 comprises a first work chamber 524a1 and 524b1, and a second work chamber 524a2 and 524b2.

The first work chambers 524a1 and 524b1 are fluidically connected, by means of a balancing line 562, to an equalising tank 564 that is kept substantially at ambient pressure, such that hydraulic fluid, for example hydraulic oil, can flow substantially unimpeded between the work chambers 524a1 and 524b1 and the reservoir 564. As is additionally shown by dashed lines on the balancing line 562, the reservoir 564 can in addition be connected to further cylinder-piston arrangements (not shown in FIG. 7), the structure and function of which substantially correspond to the cylinder-piston arrangement 524.

The second work chambers 524a2 and 524b2 are fluidically connected to a low-pressure reservoir 568 by means of a hydraulic connecting line 566, which low-pressure reservoir can be filled with hydraulic fluid against an internal pressure that can be provided by an internal gas volume for example, or can be emptied under the effect of said pressure.

It should in addition also be noted, at this point, that, merely for the sake of clarity, the low-pressure reservoir 568 is shown as a component separate from the cylinder-piston arrangement 524. It is also entirely conceivable, however, to arrange the low-pressure reservoir 568 in the direct vicinity of or on the cylinder-piston arrangement 524, since it has to be fluidically connected only to both the second work chambers 524a2 and 524b2. In this case, the connecting line 566 would be formed by through-openings between the low-pressure reservoir 566 and the second work chambers 524a2 and 524b2.

Furthermore, the second work chambers 524a2 and 524b2 are additionally fluidically connected, via the hydraulic connecting line 566, to a high-pressure reservoir 570, the structure of which substantially corresponds to that of the low-pressure reservoir 568, but which is designed for a significantly higher operating pressure than the low-pressure reservoir 568.

The cylinder-piston arrangement 524 further comprises piston rods 524a3 and 524b3, it being possible for each free end of the piston rods 524a3 and 524b3 to be connected to one steerable axle assembly, respectively, of adjacent steerable axle assemblies. It is also conceivable, however, for one of the two piston rods to be connected to the frame of the heavy goods trailer, while the other piston rod, in each case, is connected to a steerable axle assembly of the heavy goods trailer.

Furthermore, a supply check valve 576 is arranged in a fluid supply line 572 which connects the connecting line 566 to an external source 574 (indicated only schematically in FIG. 7). In the embodiment shown, the supply check valve 576 is designed as a 2/2-way valve which has an open position in which it fluidically interconnects the fluid supply line 572 and the connecting line 566, and a blocking position in which it fluidically decouples the fluid supply line 572 and the connecting line 566 from one another. Furthermore, the supply check valve 576 is designed as a valve that is pre-loaded into the blocking position, i.e. the valve will open only if, or will stay in the open position only for as long as, energy, e.g. electrical energy, is supplied thereto from a valve control means (not shown). Otherwise, said valve remains constantly in the blocking position or will close automatically as soon as the energy supply is interrupted.

Furthermore, a release check valve 580 is arranged in a fluid release line 578 that leads from the connecting line 566 to a return flow of the external source 574. In the embodiment shown, the release check valve 580 is also designed as a 2/2-way valve which is pre-loaded into the blocking position thereof. With respect to the structure and the function of the release check valve 580, reference can therefore be made to the description of the supply check valve 576.

The operation of the hydraulic arrangement 560 will be explained in greater detail in the following, with reference to FIGS. 8a to 8d. In this case, it should be noted that FIGS. 8a and 8d show a simplified structure of the hydraulic arrangement 560, merely for the purpose of improved understanding.

FIG. 8a is a simplified schematic view of the hydraulic arrangement 560 according to the invention in a state in which the heavy goods vehicle is in a forwards travel operating state.

In this state, the two check valves 576 and 580 are in the respective blocking states thereof. Therefore, portion of the hydraulic arrangement 560 comprising the cylinder-piston arrangement 524, the low-pressure reservoir 568 and the connecting line 566 forms a fluidically self-contained system in which a low pressure of for example . . . bar prevails. This pressure value is selected such that the cylinder-piston arrangement 524 is pre-loaded in a mid-position that corresponds to the straight travel direction of the associated axle assembly, but can be easily adjusted such that the axle assembly can passively follow a steering movement of the heavy goods vehicle, within the meaning of friction steering. In this case, hydraulic fluid is pushed out of at least one of the two work chambers 5524a2 and/or 524b2 in the pressure reservoir 568 or is returned therefrom into the second work chambers 5524a2 and/or 524b2, as a result of which a damping force is generated that counteracts undesired shimmying of the axle assembly.

FIG. 8b is a simplified schematic view of the hydraulic arrangement 560 according to the invention in a state in which the heavy goods vehicle is prepared for a subsequent reverse travel operating state, proceeding from the forwards travel operating state described above.

In said reverse travel operating state, the supply check valve 576 is in the open position thereof, owing to a supply of energy that is indicated by a lightning symbol, such the portion of the hydraulic arrangement 560 formed by the cylinder-piston arrangement 524, low-pressure reservoir 568 and connecting line 566, as indicated by dashed lines in FIG. 8b, is supplied with hydraulic fluid, at a predetermined pressure, from the external source 574 via the fluid supply line 572, the value of which pressure can for example be 250 bar. As a result thereof, hydraulic fluid flows into the second work chambers 524a2 and 524b2, as a result of which the piston rod 524a3 moves into the fully extended position, while the piston rod 524b3 moves into the fully retracted position. Furthermore, the low-pressure reservoir 568 fills completely with hydraulic fluid.

In order to be able to ensure that a predetermined upper pressure value is not exceeded in the portion of the hydraulic arrangement 560 formed by the cylinder-piston arrangement 524, low-pressure reservoir 568, high-pressure reservoir 570 and connecting line 566, the hydraulic arrangement 560 comprises, as shown in FIG. 7, a pressure limiting valve 584 in a short circuit line 582 connecting the fluid supply line 572 and the fluid release line 578, which valve limits the pressure to the predetermined upper pressure value, for example the above-mentioned value of 250 bar, when the supply check valve 576 is set into the open position.

Once the predetermined upper pressure value is prevailing, the energy supply to the supply check valve 576 is interrupted, as a result of which said valve is returned to the blocking position thereof under the influence of the pre-load thereof, and the supply of hydraulic fluid from the external source via the fluid supply line 572 is also interrupted, such that the hydraulic arrangement 560 is now in the reverse travel operating state, shown in FIG. 8c, in which the higher pressure value, compared with FIG. 8a, is shown by dashed lines.

Since, according to FIG. 8c, both the second work chambers 524a2 and 524b2, and the low-pressure reservoir 568 (as well as the high-pressure chamber 570), are completely filled with hydraulic fluid below the predetermined upper pressure value, when the piston rod 524a3 is fully extended or when the piston rod 524b3 is fully retracted, no hydraulic fluid can any longer be exchanged between the low-pressure reservoir 568 and the second work chambers 524a2 and 524b2, such that the cylinder-piston arrangement 524 forms a substantially rigid arrangement.

In the event of one of the two piston rods 524a3 and 524b3 being connected to a positively steered axle assembly, and the other of the two piston rods 524a3 and 524b3 being connected to an adjacent axle assembly that is friction-steered during forwards travel, the cylinder-piston arrangement 524 thus behaves like a rigid steering rod. As a result, the steering movement of the positively steered axle assembly also introduce a steering force into the adjacent axle assembly that is friction-steered during forwards travel.

However, if only one of the two piston rods 524a3 and 524b3 is connected to an axle assembly that is friction-steered during forwards travel, while the other of the two piston rods 524a3 and 524b3 is fastened to the frame of the heavy goods vehicle, the axle assembly is thus transferred into and blocked in a straight travel direction, such that reverse travel is made possible without a rotational movement of the axle assembly that is friction-steered in the forwards travel operating state arising, which movement disturbs the reverse travel.

FIG. 8d finally shows a state of the hydraulic arrangement 560 in which said arrangement is switched back into the forwards travel operating state according to FIG. 8a, proceeding from the reverse travel operating state existing in FIG. 8c.

In this state, energy is supplied to the release check valve 580 arranged in the fluid release line 578, which energy supply is indicated again in FIG. 8d, analogously to FIG. 8b, by a lightning symbol, such that said valve is transferred into the open position thereof. As a result, hydraulic fluid can flow out to the external source 574 via the fluid release line 578, until the predetermined lower pressure value again prevails in the portion of the hydraulic arrangement 560 formed by the cylinder-piston arrangement 524, low-pressure reservoir 568, high-pressure reservoir 570 (see FIG. 7) and connecting line 566.

As shown in FIG. 7, a pressure control valve 586 can furthermore be provided in the fluid release line 578, which valve prevents the pressure in the portion of the hydraulic arrangement 560 formed by the cylinder-piston arrangement 524, the low-pressure reservoir 568, the high-pressure reservoir 570 and the connecting line 566 from falling below a predetermined lower pressure value.

Once the predetermined lower pressure value is prevailing, which is also indicated in FIG. 8d by the dotted lines already introduced in FIG. 8a, the energy supply to the release check valve 580 is interrupted, as a result of which said valve is returned to the blocking position thereof under the influence of the pre-load thereof, such that the hydraulic arrangement 560 is consequently again in the forwards travel operating state according to FIG. 8a.

Finally, the hydraulic arrangement 560 according to FIG. 7 can also comprise a non-return valve 588, in order to be able to protect both the pressure limiting valve 584 and the pressure control valve 586 from a flow that is directed counter to the flow direction in the fluid release line 578.

As shown in FIG. 7, the hydraulic arrangement 560 can further comprise a main check valve 590 which is designed to fluidically couple the fluid supply line 572 to a main fluid supply line 592, and the fluid release line 578 to a main fluid release line 594, or to fluidically decouple said lines. In this case, the main fluid supply line 592 and the main fluid release line 594 are coupled to the external source 574, the external source 574 being designed to supply a hydraulic fluid, for example hydraulic oil, via the main fluid supply line 592 or to conduct said fluid away via the main fluid release line 594. The external source 574 may for example be a hydraulic assembly of a heavy goods vehicle, a heavy goods trailer, or a towing vehicle for a heavy goods trailer.

According to the present embodiment, the main check valve 590 is designed as a 4/2-way valve, which is also a valve that is pre-loaded into the blocking position thereof. It should be noted in this case, however, that the main check valve 590 has a blocking position of this kind, and that although the fluid supply line 572 and the main fluid supply line 592, or the fluid release line 578 and the main fluid release line 594, are fluidically decoupled from one another, there is a hydraulic short circuit between the main fluid supply line 592 and the main fluid release line 594. Providing a short circuit of this kind is advantageous in particular in that the hydraulic fluid can flow from the external source, via the main fluid supply line 592 and the main fluid release line 594, in the circuit, while the main check valve 590 is in the blocking position. As a result, the hydraulic fluid is not excessively heated, for example during ongoing pump operation of a hydraulic pump of the external source while the main check valve 590 is in the blocking position.

It should be noted, however, that providing a hydraulic short circuit of this kind in the main check valve 590 is not essentially required, since inadmissible heating of the hydraulic fluid can also be counteracted in that the hydraulic pump of the external source is deactivated accordingly promptly following the transfer of the main check valve 590 into the blocking position.

It should also be added that, according to FIG. 7, the connecting line 566 can furthermore be assigned a pressure display means 596 for the purpose of continuous pressure monitoring.

It should furthermore be added that, in a manner analogous to the balancing line 562, the fluid supply line 572 and the fluid release line 578 can comprise further branches, which are shown merely by dashed lines in FIG. 7, in order to be able to supply hydraulic fluid, via the main fluid supply line 592, the main fluid release line 594 and the main check valve 590, to further hydraulic arrangements that are connected in parallel and substantially correspond to the hydraulic arrangement 560.

In summary, the further subject matter of the invention is characterised by the following points:

Point 1. Hydraulic arrangement, comprising:
  a hydraulically actuatable cylinder-piston arrangement comprising at least one first work chamber and at least one second work chamber,
  a reservoir for hydraulic fluid that is kept substantially at ambient pressure and that is fluidically connected, via a balancing line, to the at least one first work chamber of the cylinder-piston arrangement,
  a pressure reservoir that is fluidically connected, via a connecting line, to the at least one second work chamber of the cylinder-piston arrangement,
  a fluid supply line for supplying hydraulic fluid to the connecting line,
  a supply check valve that is associated with the fluid supply line and is adjustable between a blocking position and an open position, the supply check valve allowing a supply of hydraulic fluid from an external source that is not part of the hydraulic arrangement to the connecting line when in the open position, while separating the external source from the connecting line when in the blocking position, and the supply check valve being a valve that is pre-loaded into the blocking position, a fluid release line for releasing hydraulic fluid from the connecting line to the external source, and a release check valve that is associated with the fluid release line and is adjustable between a blocking position and an open position, the release check valve allowing a release of hydraulic fluid from the connecting line when in the open position, while separating the external source from the connecting line when in the blocking position, and the release check valve being a valve that is pre-loaded into the blocking position.

Point 2. Hydraulic arrangement according to point 1, characterised in that a pressure control valve is furthermore arranged in the fluid release line, which valve controls the pressure in the portion of the hydraulic arrangement formed by the cylinder-piston arrangement, pressure reservoir and connecting line to a predetermined pressure value, when the release check valve is set in the open position.

Point 3. Hydraulic arrangement according to either point 1 or point 2, characterised in that a pressure limiting valve is arranged in a short circuit line that interconnects the fluid supply line and the fluid release line, which pressure limiting valve controls the pressure in the portion of the hydraulic arrangement formed by the cylinder-piston arrangement, pressure reservoir and connecting line to a predetermined pressure value, when the supply check valve is set in the open position.

Point 4. Hydraulic arrangement according to points 2 and 3, characterised in that the predetermined pressure value of the pressure control valve arranged in the fluid release line is lower than the predetermined pressure value of the pressure limiting valve arranged in the short circuit line.

Point 5. Hydraulic arrangement according to any of points 2 to 4, characterised in that a non-return valve is furthermore arranged in the fluid release line, and specifically at a point that is located between the external source and the release check valve and the pressure control valve arranged in the fluid release line, and preferably also the mouth of the short circuit line in the fluid release line.

Point 6. Hydraulic arrangement according to any of the preceding points, characterised in that a further pressure reservoir is additionally assigned to the connecting line, the pre-load of which pressure reservoir, by which it opposes the storage of hydraulic fluid therein, is of a higher value than that of the other pressure reservoir.

Point 7. Hydraulic arrangement according to any of the preceding points, characterised in that the connecting line is furthermore associated with a pressure display means.

Point 8. Hydraulic arrangement according to any of the preceding points, characterised in that a main check valve that is adjustable between a blocking position and an open position is furthermore provided, which valve is associated with the fluid supply line and the fluid release line, together, the main check valve connecting the external source both to the fluid supply line and to the fluid release line, in the open position, while separating both the fluid supply line and the fluid release line from the external source, in the blocking position, but interconnecting the two source-side line portions of the fluid supply line and the fluid release line, and the main check valve being a valve that is pre-loaded into the blocking position.

Point 9. Hydraulic arrangement according to any of the preceding points, characterised in that the cylinder-piston arrangement comprises a dual cylinder, specifically a cylinder having two interiors, each of which is divided, by a piston, into a first working space and a second working space, the piston rods connected to the two pistons emerging from the dual cylinder at mutually opposing ends of the cylinder-piston arrangement.

Point 10. Hydraulic arrangement according to point 9, characterised in that the first working space, in one interior of the dual cylinder, is penetrated by the associated piston rod, while the second working space, in the other interior of the dual cylinder, in each case, is penetrated by the associated piston rod.

The invention claimed is:

1. An axle assembly which is designed and intended to be used in a heavy goods vehicle, the axle assembly comprising:

a pivot bearing having a substantially vertically extending steering rotational axis (X), a wheel support that is arranged so as to be rotatable about the steering rotational axis (X) and comprises at least one wheel that is mounted thereon so as to be rotatable about a wheel rotational axis (Z), the wheel rotational axis (Z) extending substantially horizontally and, in the case of straight travel, transversely to a travel direction (V), and the wheel rotational axis (Z) being arranged behind the steering rotational axis (X), in the travel direction (V), in every deflection state of the axle assembly, during straight travel, and a unit that is adjustable about the steering rotational axis (X) when the wheel support is rotated, the adjustable unit being adjustable between two operating states, specifically a forwards travel operating state in which it influences the rotational movement of the wheel support about the steering rotational axis (X), and a reverse travel operating state in which it introduces a steering force, which steers the axle assembly, into the axle assembly, such that the axle assembly is operated as a positively steered axle assembly.

2. The axle assembly according to claim 1,
characterised in that the adjustable unit comprises two or more elements that are adjustable relative to one another, at least two of said adjustable elements being in frictional contact with one another.

3. The axle assembly according to claim 1,
characterised in that the adjustable unit comprises a cylinder-piston arrangement having a throttle.

4. The axle assembly according to claim 2,
characterised in that the two or more elements that are adjustable relative to one another are connected to form an intrinsically rigid unit in the reverse travel operating state.

5. The axle assembly according to claim 4,
characterised in that the adjustable unit is designed as a cylinder-piston arrangement wherein the cylinder-piston arrangement comprises two cylinder-piston units, the ends of which that are opposite a piston rod outlet end in each case are interconnected in an operationally fixed manner.

6. The axle assembly according to claim 1, characterised in that the adjustable unit is designed as a steering force generation unit.

7. The axle assembly according to claim 6, characterised in that the steering force generation unit is designed as a cylinder-piston assembly comprising a cylinder-piston arrangement which is actively supplied with operating fluid by a fluid pump.

8. The axle assembly according to claim 6, characterised in that the steering force generation unit is designed having a single circuit.

9. The axle assembly according to claim 6, characterised in that a free end of the adjustable unit is designed to be fastened to a frame of the heavy goods vehicle.

10. The axle assembly according to claim 6, characterised in that a free end of the adjustable unit is designed to be connected to an adjacent axle assembly.

11. The axle assembly according to claim 1, characterised in that the adjustable unit is arranged in front of the steering rotational axis (X), in the forward travel direction (V).

12. The axle assembly according to claim 1, characterised in that a free end of the adjustable unit engages on a transmission lever, to which one end of a steering rod is hinged, the other end of which steering rod is connected to the pivot bearing.

* * * * *